United States Patent
Orr et al.

(10) Patent No.: US 9,836,589 B1
(45) Date of Patent: Dec. 5, 2017

(54) SYSTEMS AND METHODS FOR ALLOWING ADMINISTRATIVE ACCESS

(71) Applicant: Confinement Telephony Technology, LLC, Greensboro, NC (US)

(72) Inventors: Charles David Orr, Burlington, NC (US); Zachary Alan Way, Greensboro, NC (US); Peter Slauta, III, Graham, NC (US); David Charles Woody, Durham, NC (US); Matthew Robert Polmanteer, Winston Salem, NC (US); Rick Allen Lubbehusen, Winston Salem, NC (US); John Vincent Townsend, III, Kernersville, NC (US)

(73) Assignee: CONFINEMENT TELEPHONY TECHNOLOGY, LLC, Greensboro, NC (US)

( * ) Notice: Subject to any disclaimer, the term of this patent is extended or adjusted under 35 U.S.C. 154(b) by 0 days.

(21) Appl. No.: 14/816,621

(22) Filed: Aug. 3, 2015

Related U.S. Application Data

(60) Provisional application No. 62/041,269, filed on Aug. 25, 2014.

(51) Int. Cl.
  *G06F 21/31* (2013.01)
  *H04W 4/00* (2009.01)
  *H04M 1/725* (2006.01)

(52) U.S. Cl.
  CPC ........ *G06F 21/31* (2013.01); *H04M 1/72577* (2013.01); *H04W 4/008* (2013.01)

(58) Field of Classification Search
  CPC ...................................................... G06F 21/34
  See application file for complete search history.

(56) References Cited

U.S. PATENT DOCUMENTS

| | | | | |
|---|---|---|---|---|
| 7,403,766 B2* | 7/2008 | Hodge | .................... | H04M 1/67 455/411 |
| 7,647,628 B2* | 1/2010 | Kebinger | ................ | G06F 21/31 726/17 |
| 2007/0245369 A1* | 10/2007 | Thompson | ......... | G07C 9/00103 725/30 |
| 2014/0289842 A1* | 9/2014 | Cornick | ................ | H04L 9/3231 726/19 |
| 2015/0079967 A1* | 3/2015 | Mullins | ................. | H04W 48/04 455/419 |

FOREIGN PATENT DOCUMENTS

EP 1 139200 A2 * 4/2001 ............... G06F 1/00

OTHER PUBLICATIONS

Cisco, Site Administration User's Guide, Jul. 22, 2009.*

* cited by examiner

*Primary Examiner* — Kambiz Zand
*Assistant Examiner* — Thanh Le
(74) *Attorney, Agent, or Firm* — Thompson Hine LLP

(57) ABSTRACT

Systems and methods for providing services to administrative personnel and other persons using electronic devices in an institution. One method involves receiving an identifier entered as input on an electronic device and receiving a security code entered as input on the portable electronic device or transmitted to the electronic device, wherein the security code was generated by a security token and security codes generated by the security token change over time. The method further involves authenticating the person based on the identifier and the security code and allowing access to one or more administrative services based on the authenticating.

11 Claims, 3 Drawing Sheets

SYSTEMS AND METHODS FOR ALLOWING ADMINISTRATIVE ACCESS

RELATED APPLICATIONS

This application claims the benefit of U.S. Provisional Application No. 62/041,269 filed on Aug. 25, 2014, entitled "Systems and Methods for Allowing Administrative Access," which is incorporated herein by this reference in its entirety.

FIELD OF THE INVENTION

The present disclosure relates to allowing institutional staff within a controlled access residential institution access to administrative functions within the telecommunication system.

BACKGROUND OF THE INVENTION

In the context of the daily operation of a residential institution, such as a correctional or confinement facility, proper management of the telecommunications system has traditionally been accomplished in a variety of time-consuming and inefficient manners. The residential institution will typically assign one or two staff members to manage the telecommunications platform in addition to their other duties. These staff members are commonly referred to as telecommunications system administrators. Whenever a change or modification to the system is required, the system administrator is notified and performs or coordinates the change or modification.

In one common example, the residential institution desires to enable or disable a specific feature on an individual phone or system wide on the telecommunications system. The systems administrator is notified of the change and, as duties/time permit, the administrator will access the telecommunications system to make the necessary change.

In another common example, issues arise in systems in which residents are required to authenticate with a voice biometric system in order to utilize the telecommunications system when a resident is denied the ability to use the system due to erroneous or missing voice biometric enrollment. Erroneous enrollments with a voice biometric system happen for a variety of reasons; background noise, uncompliant, intoxicated, or sick residents, etcetera. The resident generally must notify the institutional staff who then must notify the system administrator. The system administrator will research the problem and, upon determining the cause is due the voice enrollment with the voice biometrics system, will reset the resident enrollment within the telecommunications system. The system administrator will then notify the institutional staff whom reported the initial problem who will then escort the resident to a controlled area where voice biometric enrollment phones are located so that the resident may re-enroll in the voice biometric system. This imposes a large time burden on institutional staff and accordingly, leads to inefficiency, poor utilization of otherwise specialized personnel, and slow turnaround times for the customer, i.e. the resident. This process also imposes a security risk due to the institutional staff being required to move a resident to different areas of the institution.

Yet another common example, when residents are moved within a residential institution the institutional staff is required to update the institutional computer systems with the new location of the resident. Resident movement within the institution may be permanent e.g. move to a new housing unit, or temporary e.g. extended stay in the infirmary. Regardless of the duration, the institutional systems, including the telecommunications systems, must be updated with the resident's new location.

SUMMARY OF THE INVENTION

One embodiment allows institutional staff limited administrative access to the telecommunications systems via any handset connected to the system by entering a security code generated from a security token. Upon successful verification of the security code, the telecommunications systems will allow institutional staff to make changes to the system via the handset.

Yet another embodiment allows institutional staff limited administrative access by entering a security code generated from a security token to enable features on electronic devices utilized within the residential institution. Electronic device to include, but not limited to, mobile devices, tablets, and kiosks.

Yet another embodiment allows telecommunication system provider staff full administrative access by entering a security code generated from a security token to the telecommunication systems and/or electronic devices.

In yet another embodiment institutional staff will be able to update a resident's location via the telecommunications systems within the institutional computer systems by entering a security code generated from a security token.

These embodiments and aspects of certain embodiments are provided to introduce the subject matter of this patent. The claims define the scope of the patent and should not be limited based on this summary.

DETAILED DESCRIPTION

Figure 1:
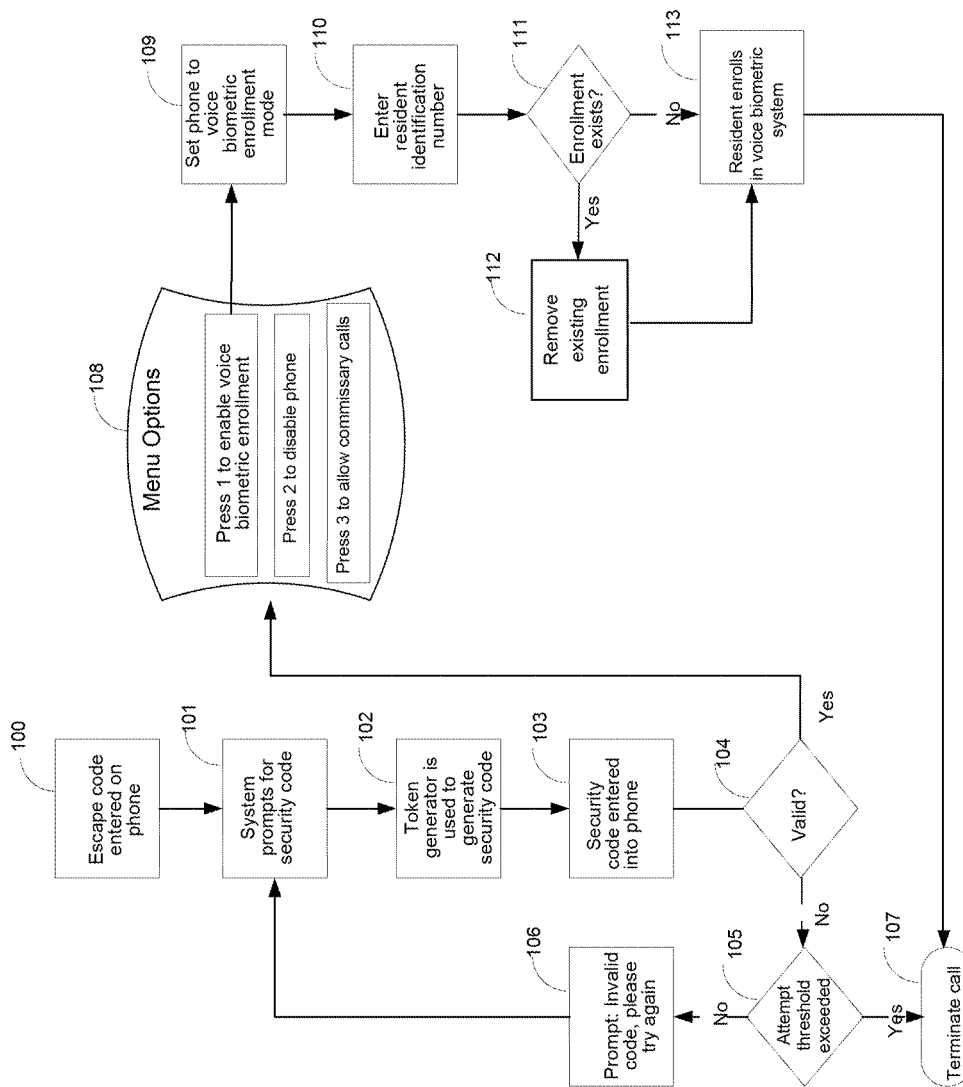
FIG. 1 is a flow chart illustrating functions performed to place a phone into voice biometric enrollment mode using a security code generated by a security token.

The limitations of prior art are overcome and a technical advance is made in accordance with the present subject matter, detailed embodiments of which are presented in the following detailed description.

One embodiment involves allowing the institutional staff to enter an escape code, e.g. depressing # and * within two seconds of going off hook, on any phone within the institution controlled by the telecommunications system. Upon verification of the escape code, the telecommunications system will prompt the institutional staff for their security code generated from a security token to be entered via key pad on the phone, spoken into the phone, transferred by wireless link e.g. Bluetooth, Radio Frequency (RF), Radio Frequency Identification (RFID), Near Field Communications (NFC), and etcetera. The security code can be generated via the Time-based One-time Password Algorithm (TOTP) and Open Authentication (OATH) protocols and procedures. The security token may be in the form of a token generator, wristband, software, web-based browser application, mobile software designed for smartphone and/or tablets, and custom device or software designed for security code generation. Additionally the security code may be any length of numerical, alphabetic, or special characters.

The telecommunications system may provide the institutional staff with a verbal menu of options and/or features available which may be performed via the handset. Menu options including, but not limited to, enabling or disabling a single phone, enabling or disabling all phones within a housing unit, enabling or disabling all phones within the institution, placing a phone into voice biometric enrollment mode, changing the calling features of a single phone or multiple phones including, but not limited to, call duration, disable or enable recording, allow commissary calls, free local calls, and type of calls allowed. Type of calls allowed to include, but not limited to, local, interstate, intrastate, and international. Alternatively the telecommunications system may allow for the institutional staff to speak the instructions into the handset e.g. "Disable phone A1" or "Enable voice biometric enrollment". Additionally, based on the security code entered the telecommunications system will allow for various levels of administrative access, e.g. a security code may only have access to place a phone into voice biometric mode, whereas another security code may have full access to the system. The system's administrator and/or telecommunications provider may enable enhanced administrative privileges on a security code that will expire after a set amount of time has elapsed. Once the institutional staff has completed making systems changes hanging up the phone will return the phone to normal operation. In certain instances staff will have the option of setting the phone into a permanent administrative mode requiring staff to then enter a subsequent security code to remove the phone from administrative mode, e.g. a staff member may enable a specific phone for performing multiple voice biometric enrollments and, upon completion, the staff member may then be required to manually return the phone to normal operation by entering their security code. The telecommunication system may evoke a time limit that a phone or device is allowed to be in a permanent administrative mode, if the time limit is exceeded the phone will automatically resume normal operation.

In accordance with another aspect of illustrative embodiment of the current invention, institutional staff, by entering a security code generated from a security token, will have access to administrative functions on electronic devices utilized within the residential institution. Electronic devices, including, but not limited to, mobile devices, smart phones, tablets, laptop computers, desktop computers, and kiosks. Upon the institutional system successfully validating the code, the institutional staff will have access to enable and disable features on the electronic devices. Features, including, but not limited to, commissary ordering, inmate banking, messaging services, internet access, audio/music, movies, video visitation, and etcetera. Institutional systems, including, but not limited to, institutional management systems, telecommunication systems, commissary systems, and inmate banking systems.

Another aspect of the present invention allows for institutional staff to modify a resident's location within the institutional systems upon movement. For example, a resident is taken to the infirmary and will be there overnight. Institutional staff will be able to alter the resident's location from their housing unit to the infirmary in the institutional systems via the telecommunications system upon successful verification of their security code generated from a security token. Updating the location may take the form of menu options or verbal commands.

Yet another aspect of the present invention allows telecommunication provider staff to have full administrative access to the telecommunication system from any handset connected to the system upon successful verification of a security code generated from a security token.

It is understood that the security code may be entered into the system via a phone connected to the telecommunication service and/or tablet or any other electronic device. Additionally verbal commands may be spoken into a handset connected to the telecommunications device and/or microphone attached to a tablet, smart phone, laptop, etcetera. Success verification of a security code generated from a security token on any device, e.g. phone, tablet, smart phone, etcetera, will grant administrative access to any device within the residential institution not just the device where the security code is entered. Devices may be administrated singly, in a group, or as a whole, or any combination thereof. It is also understood that security tokens may be disabled at any point in time therefore rendering security codes generated from the particular security token invalid.

FIG. 1 illustrates the process performed for setting an individual phone within a residential institution into voice biometric enrollment mode. At box 100 the institutional staff takes the phone off hook and enters the escape code, e.g. # and * within 'X' seconds. The escape code may consist of any numbers or symbols and last for any duration of time, the previous example is used for illustrative purposes only. Upon the telecommunications system detecting and verifying the correct escape code has been entered, the system will prompt the institutional staff to enter his or her security code at box 101. The institutional staff will utilize a token generator at box 102 to generate a one-time code to be entered at box 103. At box 104 the security code is validated against the telecommunication systems and databases. The system will allow for 'X' number of attempts at entering a successful security code. Upon failure to enter a successful code at box 104 the system will check for the number of failures at box 105, if the attempt threshold has not been exceeded the system will inform the institutional staff they have entered an invalid code at box 106 and will then prompt for a new code at box 101. If at box 105 the attempt threshold has been exceeded the system will terminate the call at box 107 and the phone will be returned to normal operation. If the code was validated successfully at box 104 the institutional staff is presented with a list of menu options at box 108, e.g. Press 1 to enable voice biometric enrollment, Press 2 to disable phone, Press 3 to allow commissary calls. The previous example is used for illustrative purposes only, a menu could provide a variety of options. The staff presses 1 and the system sets the phone to voice biometric enrollment mode at box 109. At box 110 the system prompts for the resident identification number and verifies whether or not an existing enrollment exists at box 111. If an existing enrollment exists, it is removed at box 112 then the system prompts the resident to enroll in the voice biometric system at box 113. If an existing enrollment does not exist at box 111 the system prompts the resident to enroll in the voice biometric system at box 113. The call is then terminated at box 107. Following termination of the call the phone is removed from voice biometric enrollment mode and placed back into normal operation.

Any suitable computing system or group of computing systems can be used to implement the processes disclosed herein.

Figure 2:
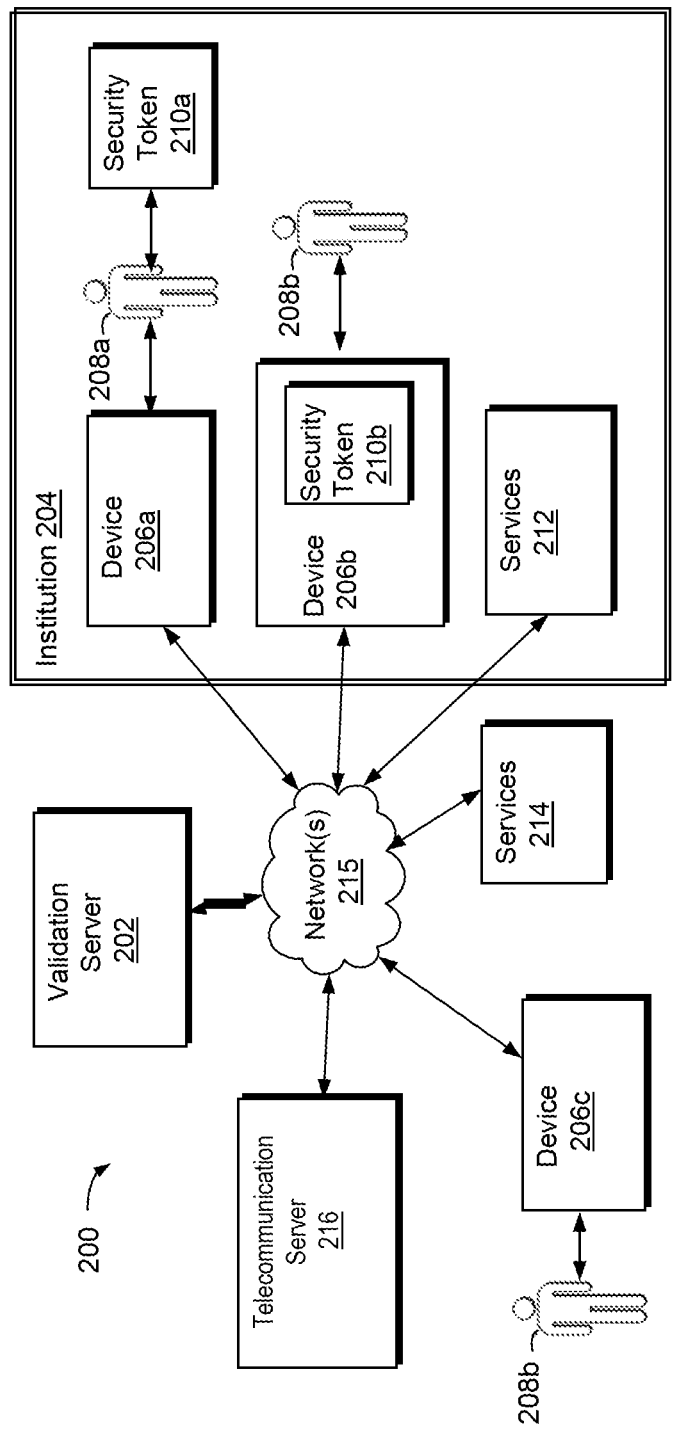
FIG. 2 is a block diagram depicting an example of a system for providing administrative access in an institution.

FIG. 2 is a block diagram depicting an example of a system for providing administrative access in an institution. In one embodiment a validation server 202 is used to validate a security code used by individuals 208a, 208b to access services using institution devices 206a, 206b within institution 204 and other device 206c outside of institution 204. Specifically, the validation server 202, in this example, requires that entry or provision of a security code before providing access to services 212 provided by the institution 204 and/or services 214 provided by one or more systems outside of the institution 204. In this example, individual 208a is an employee of the institution who uses a security token 210a provided in a separate device to generate a security code that is entered into or provided to device 206a. Use of the device 206a is partially or entirely restricted until the validation server 202 validates the security code. Individual 208b is an employee of the institution who uses a security token 210a provided by an application on the device 206b to generate a security code that is entered into or provided to device 206b. In one example, the individual 208b uses biometric information, such as a fingerprint scan, to obtain the security code.

Each of security tokens 210a and 210b is accessible only to the individual who has been authorized to access the respective device. Specifically, security token 210a is a device that individual 208 wears or otherwise maintains control over so that other individuals do not have access to it. If the security token 210a is lost or stolen, it can be quickly reported so that security codes generated by the security token 210a no longer work. Security token 210b is only accessible using biometric information so that other individuals cannot obtain the required security codes. The security codes can change over time (e.g., 1 time use codes, codes that change periodically, etc.) so that access to the security token is required to gain access to the services 212, 214.

A device that is in use can periodically require that a fresh security code be provided so that a device stolen in an unlocked state cannot be used.

The validation server 202 may control access to services 212, 214 and/or telecommunications provided by telecommunications server 216.

Communications in the system 200 are illustrated as through network(s) 215, however, any appropriate network or communication system may be used.

In one example, validation server 202 controls the provision of services provided to administrative personnel of the institution 204 using a method that involves receiving a person's identifier entered as input on a portable electronic device, such as a tablet or cell phone.

The method further involves receiving a security code entered as input on the portable electronic device or transmitted to the portable electronic device. The security code was generated by a security token and all security codes generated by the security token change over time. The security token can be, as examples, a physical device provided to the person, a device worn by the person, software on the portable electronic device used to access the services 212, 214 or on another device, or any other appropriate security code generator. The security code can thus be generated based on biometric input provided by the person, generated on the portable electronic device or another device, or generated in any other appropriate way. The security code can be received by receiving a Bluetooth, radio-frequency (RF), or wireless message at the portable electronic device.

The method further involves authenticating the person based on the identifier and the security code and allowing access to one or more services based on the authenticating. Authentication can further be based on a personal identification number (PIN) known only to the person as an additional measure of security.

In one alternative embodiment, the functionality of validation server 202 is included on each of the devices 206a, 206b and/or device 206c to control access to services 212, 214.

Figure 3:
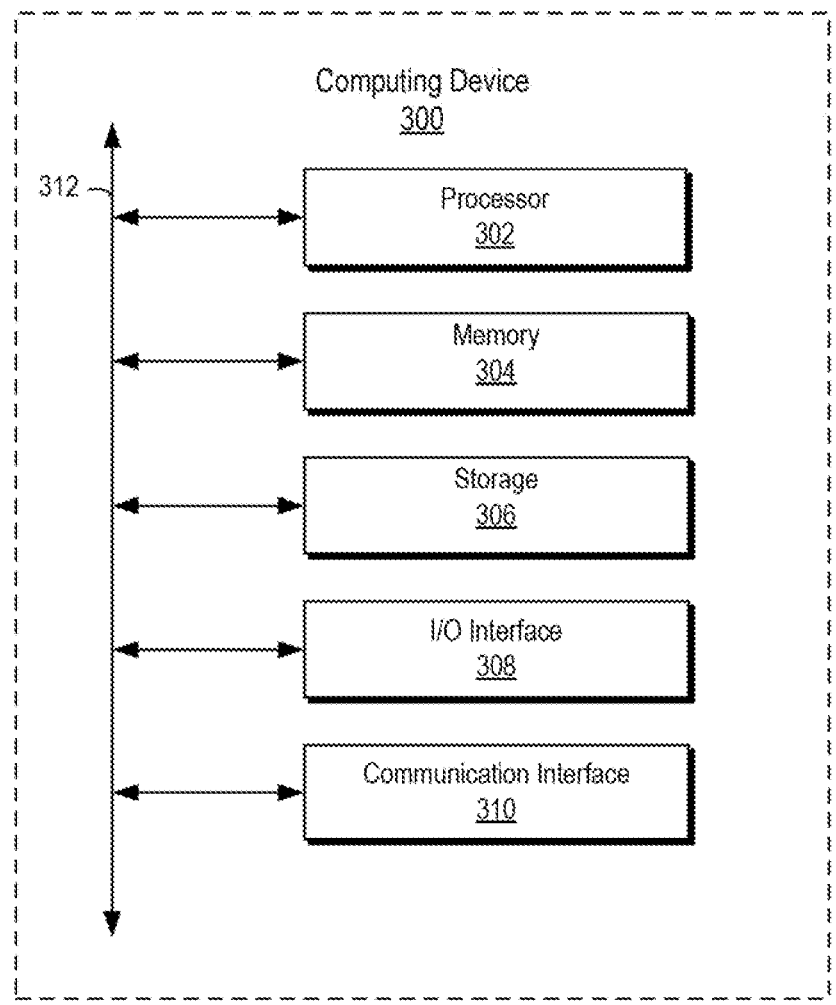
FIG. 3 is a block diagram depicting example hardware implementations for the components described in FIG. 2.

FIG. 3 is a block diagram depicting example hardware implementations for the servers and devices described in FIG. 2. Each such server or device 300 may include a processor 302 that is communicatively coupled to memory 304 and storage 306 and that executes computer-executable program code and/or access information stored in the memory 304 and storage 306. The processor 302 may comprise a microprocessor, an application-specific integrated circuit ("ASIC"), a state machine, or other processing device. The processor 302 can include any of a number of processing devices, including one. Such a processor 302 can include or may be in communication with a computer-readable medium storing instructions that, when executed by the process, cause the processor to perform the operations described herein.

The memory 304 and storage 306 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++ C#, Visual Basic, Java, Python, Perl, JavaScript, and ActionScript.

The device 300 may also comprise a number of external or internal devices such as input or output devices. For example, the device 300 may have input/output ("I/O") interface 308 that can receive input from input devices or provide output to output devices. A bus 312 can also be included in the device 300. The bus 312 can communicatively couple one or more components of the server. The server can execute program code that configures the processor to perform one or more of the operations described above with respect to the Figures. The program code may be resident in the memory or any suitable computer-readable medium and may be executed by the processor or any other suitable processor. In additional or alternative embodiments, program code can be resident in a memory that is accessible via a data network, such as a memory accessible to a cloud service.

The device 300 can also include at least one network interface device or other communication interface 310. The communication interface 310 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

An electronic device can be a computer, telephone, mobile device, tablet, smart phone, smart watch, or any communications device. A communications device can include a processor, memory, a bus, input/output components, network interface components, and other appropriate communication components. Non-limiting examples of input devices include a touch screen (e.g., one or more cameras for imaging a touch area or pressure sensors for detecting pressure change caused by a touch), a mouse, a keyboard, or any other device that can be used to generate input events in response to physical actions by a user of a computing device, or a microphone. Non-limiting examples of output devices include an LCD screen, an external monitor, a speaker, or any other device that can be used to display or otherwise present outputs generated by a computing device. The device can execute program code that configures the processor to perform one or more of the operations described above.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not be described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

The foregoing description and summary of the invention are to be understood as being in every respect illustrative and exemplary, but not restrictive, and the scope of the invention disclosed herein is not to be determined only from the detailed description of illustrative embodiments but according to the full breadth permitted by patent laws. It is to be understood that the embodiments shown and described herein are only illustrative of the principles of the present invention and that various modification may be implemented by those skilled in the art without departing from the scope and spirit of the invention.

That which is claimed is:

1. In a computing environment in which services are provided via a communications system to persons using phones or tablets in an institution, a method comprising:
    granting residents rights to use the phones or tablets in normal operation for calls or video visitations using the communications system;
    receiving an identifier entered as input by an institutional staff officer on a phone or tablet;
    receiving a security code entered as input by the institutional staff officer on the phone or tablet or transmitted to the phone or tablet, wherein the security code was generated by a security token, security codes generated by the security token changing over time;
    authenticating the institutional staff officer based on the identifier and the security code;
    based on the authenticating, changing the phone or tablet from normal operation to administrative access mode to allow the institutional staff officer access to one or more administrative services on the phone or tablet, wherein the administrative services allow the institutional staff officer to modify locations of residents within the institutional systems via the phone or tablet,
    receiving input on the phone or tablet from the institutional staff officer to modify a location of a resident when the resident is moved to a new location within the institution; and
    modifying the resident's location within the institutional systems with the new location based on the input.

2. The method of claim 1, wherein the administrative services allow the institutional staff officer to change calling features for residents using the phones or tablets for calls or video visitation, wherein the calling features:
    control call duration;
    disable or enable recording;
    control commissary calls;
    control free local calls; and
    control types of calls allowed.

3. The method of claim 1 further comprising providing differing levels of administrative access depending on the security code.

4. The method of claim 1, wherein the security token is a physical device provided to the institutional staff officer.

5. The method of claim 4, wherein the physical device is a wearable electronic device.

6. The method of claim 1, wherein the security code is generated based on biometric input provided by the institutional staff officer.

7. The method of claim 1, wherein receiving the security code comprises receiving the security code via a Bluetooth, radio-frequency (RF), or wireless message at the electronic device.

8. In a computing environment in which services are provided via a communications system to persons using phones or tablets in an institution, a method comprising:
    granting residents rights to use the phones or tablets in normal operation for calls or video visitations using the communications system;
    receiving an identifier entered by an institutional staff officer as input on a phone or tablet of the phones or tablets;
    receiving a security code entered by the institutional staff officer as input on the phone or tablet or transmitted to the phone or tablet, wherein the security code was generated by a security token, security codes generated by the security token changing over time;

based on the security code generated by the security token, receiving input from the institutional staff officer placing the phone or tablet into voice biometric enrollment mode;

in voice biometric enrollment mode, prompting for a resident identification number of a resident and for the resident to enroll in a voice biometric system; and after enrolling the resident in the voice biometric system, receiving input from the institutional staff officer removing the phone or tablet from voice biometric mode and placing the phone or tablet back into normal operation for residents to use for calls or video visitations using the communications system.

9. In a computing environment in which services are provided to persons using phones in an institution, a method for temporarily allowing a resident phone to be used for voice biometric enrollment, the method comprising:

receiving an escape code after the phone is taken off hook;

based on detecting and verifying that a correct escape code has been entered, requesting entry of a security code;

receiving the security code, wherein the security code was generated by a security token, security codes generated by the security token changing over time;

based on validating the security code, providing an option to enable voice biometric enrollment on the phone;

receiving input from an institutional staff officer to enable voice biometric enrollment on the phone;

based on the input enabling voice biometric enrollment, requesting a resident identification number;

based on the identification number, prompting the resident to enroll in the voice biometric system;

enrolling the resident in the voice biometric system based on a voice sample received at the phone;

disabling voice biometric enrollment on the phone and placing the phone back into normal operation for residents to use for calls or video visitations using the communications system.

10. The method of claim 9, wherein disabling the voice biometric enrollment on the phone comprises disabling the voice biometric enrollment based on re-entry of the security code by the institutional staff officer.

11. The method of claim 9, wherein disabling the voice biometric enrollment on the phone comprises automatically disabling the voice biometric enrollment based on a time limit, wherein, once the time limit is exceeded, the phone automatically resumes normal operation.

* * * * *